United States Patent [19]

Kessler, Jr.

[11] Patent Number: 4,869,420
[45] Date of Patent: Sep. 26, 1989

[54] METHOD OF DIFFUSION BONDING AND DENSIFYING MATERIAL OF A HEATER ELEMENT FOR AN ELECTRON BEAM TUBE

[75] Inventor: Sebastian W. Kessler, Jr., San Mateo, Calif.

[73] Assignee: Varian Associates, Inc., Palo Alto, Calif.

[21] Appl. No.: 287,254

[22] Filed: Dec. 20, 1988

Related U.S. Application Data

[62] Division of Ser. No. 95,482, Sep. 10, 1987, Pat. No. 4,851,057, which is a division of Ser. No. 807,576, Dec. 11, 1985, Pat. No. 4,717,067.

[51] Int. Cl.⁴ .................................................. H05B 3/06
[52] U.S. Cl. ...................................... 228/115; 313/15; 228/213; 228/116; 228/124; 228/151; 372/72; 219/288; 219/552
[58] Field of Search ..................... 219/552, 553, 288; 372/72; 313/15; 228/115, 116, 117, 124, 151, 155, 193, 213, 212

[56] References Cited

U.S. PATENT DOCUMENTS

| | | |
|---|---|---|
| 1,959,906 | 5/1934 | Dixon .................................. 313/15 |
| 2,707,823 | 5/1955 | Sowter ................................ 228/115 |
| 2,790,884 | 4/1957 | Gilbert ............................... 219/552 |
| 2,894,323 | 7/1959 | Sowter et al. ..................... 228/115 |
| 3,798,417 | 3/1974 | Bittner .............................. 219/552 |
| 4,292,504 | 9/1981 | Gebarowski et al. ............... 219/552 |
| 4,423,120 | 12/1983 | Paulus et al. ..................... 228/116 |
| 4,452,389 | 6/1984 | Amin ................................. 228/116 |
| 4,656,561 | 4/1987 | Shinbo et al. ..................... 313/15 |
| 4,687,911 | 8/1987 | Lucey et al. ..................... 219/553 |
| 4,786,781 | 11/1988 | Nozaki et al. ..................... 219/552 |

FOREIGN PATENT DOCUMENTS 0171450 9/1984 Japan ..................................... 313/15

Primary Examiner—Richard K. Seidel
Assistant Examiner—Michael William Starkweather
Attorney, Agent, or Firm—Stanley Z. Cole; Gerald M. Fisher; Kenneth L. Warsh

[57] ABSTRACT

Refractory metals or ceramics are diffusion bonded or densified by assembling the workpieces to be bonded, wrapping the assembly with carbon yarn, heating the wrapped assembly, cooling the assembly and unwrapping. The expansion of the workpieces together with the shrinking of the carbon yarn produces tremendous pressures which cause bonding and densifying of the workpiece.

3 Claims, 2 Drawing Sheets

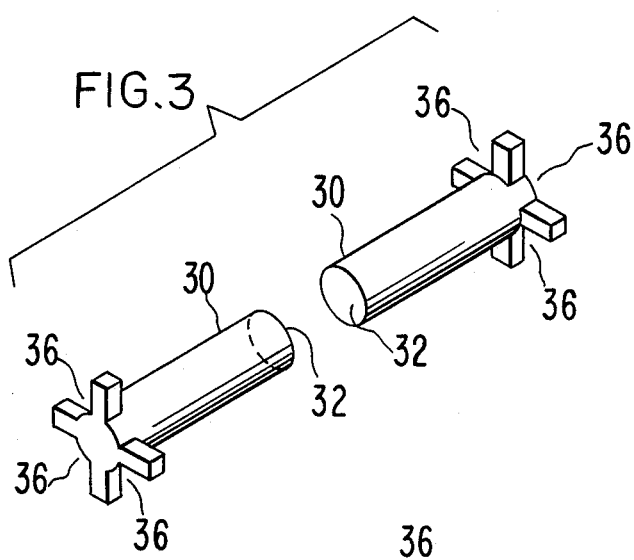
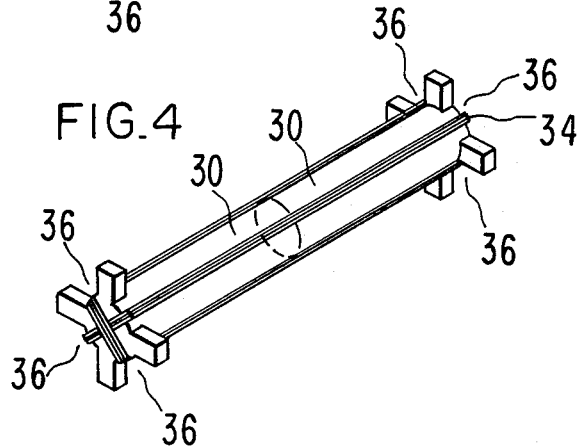
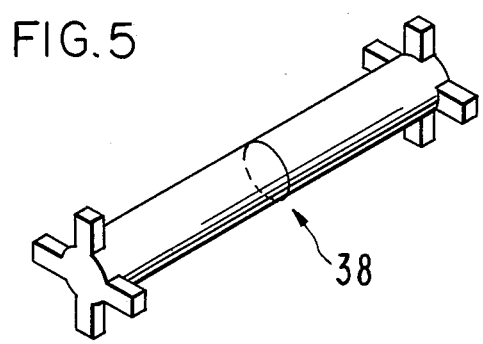

METHOD OF DIFFUSION BONDING AND DENSIFYING MATERIAL OF A HEATER ELEMENT FOR AN ELECTRON BEAM TUBE

This is a divisional of U.S. Application 095,482, now U.S. Pat. No. 4,851,057, which is a divisional of U.S. Application No. 807,576, filed Dec. 11, 1985, now U.S. Pat. No. 4,717,067.

FIELD OF THE INVENTION

This invention pertains to a method of bonding refractory metals and ceramic material, more particularly to diffusion bonding under heat and pressure of such materials.

BACKGROUND OF THE INVENTION

It is often necesssary to join fine wires of refractory metals in electron tube structures. Methods using a second metal or material are undesirable for the properties of the alloyed joints they produce. Similarly, it is often desired to join ceramics without the use of cements or solders to avoid the contamination that the intervening material introduces.

In one prior art method, nickel plated thoriated tungsten wires are wrapped tightly onto an alumina mandrel to form a mesh. The ends of the mesh are held onto the mandrel with nickel plated tungsten and molybdenum tie wires while the mesh is diffused in a hydrogen furnace at 1350° C. In the furnace the nickel plating diffuses into the tungsten, forming bonds between the crossing wires. This procedure has the disadvantage that the nickel must be evaporated from the wire before carburizing, and while doing so, some Ni atoms diffuse into the tungsten. These foreign atoms lower the recrystallization temperature of the tungsten, embrittle the wire, and lowers the strength of the wire.

Another prior art method uses spot welding of wires at their intersections. This method, as shown in U.S. Pat. Nos. 3,737,711 and 3,724,424 introduces considerable strain because of the deformation from welding distorts the mesh.

OBJECT OF THE INVENTION

It is an object of the invention to describe a method of joining alumina or refractory metals together without any intervening material at the interface between the parts.

Another object of the invention is to describe a method of joining fine wires together while eliminating further steps before carburizing the wires.

SUMMARY OF THE INVENTION

This object of the invention and other objects, features and advantages to become apparent as the specification progresses are accomplished by the invention, according to which, briefly states, the clean ceramic faces or refractory metal pieces are held together with several layers of carbon yarn. This structure is then heated in a high temperature oven. The difference of coefficient of expansion of the workpiece and the carbon yarn creates a pressure which when combined with the heat causes a diffusion bonding without intervening material. A carburizing of metal also takes place simultaneously.

These and further constructional and operational characteristics of the invention will be more evident from the detailed description given hereinafter with reference to the figures of the accompanying drawings which illustrate preferred embodiments and alternatives by way of non-limiting examples.

BRIEF DESCRIPTION OF THE DRAWINGS

FIG. 3 is a perspective view of a pair of workpieces to be bonded according to the method.

FIG. 4 is a perspective view of the pair of workpieces of FIG. 3 joined by wrapping with carbon yarn.

FIG. 5 is a perspective view of the finished piece joined according to the method of the invention.

DESCRIPTION OF THE PREFERRED EMBODIMENTS

Figure 1:
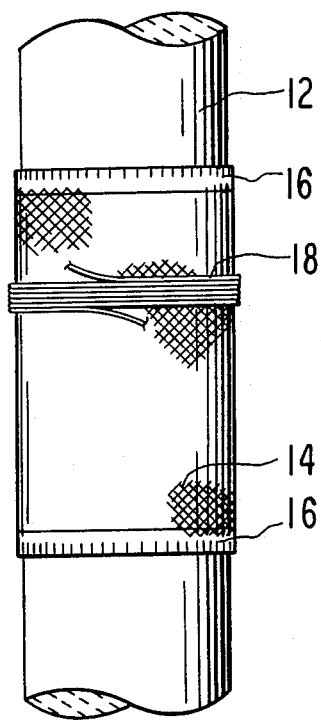
FIG. 1 is a schematic of the formation of a bonded grid filament according to the method of the invention.
Figure 2:
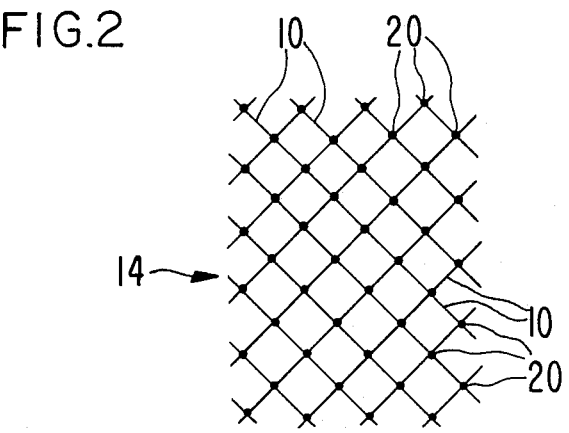
FIG. 2 is a schematic of the bonded grid formed according to the method.

Referring now to the drawings wherein reference numerals are used to designate parts throughout the various figures thereof, there is shown in FIGS. 1 and 2 wires 10 of tungsten or other refractory metal are wrapped tightly on a mandrel 12 made of suitable materials such as alumina or silicon carbide to form a mesh filament 14. In contrast to the method of the prior art described above, the wires 10 are not nickel plated. Bands 16 should be wrapped onto the mandrel 12 before the wire 10. The bands 16 facilitate mounting the filament 14 onto the tube by providing a strip of metal which can easily be spot-welded to supports. The wires 10 are also diffusion bonded to the bands 16. The bands 16 can be made of the same refractory metal as the wires 10 or a different material such as molybdenum bands with tungsten wire. The ends of the carbons yarn are tied with a square knot and then coated with a dab of Loctite TAK-PAK (Trademark) adhesive. This adhesive hardens in less than 10 seconds and is very handy in making temporary joints while wrapping a filament. The adhesive thermally decomposes in the furnace at low temperatures.

Following the wrapping of the wire, the mesh filament 14 on the alumina mandrel 12 is then covered with two continuous layers of carbon yarn 18 (shown in part). The yarn 18 is wrapped tightly so that it squeezes each crossing wire in the mesh filament 14 when the mesh filament 14 is diffusion bonded at a temperature range of 1300 to 1600° C. in a hydrogen, vacuum or inert atmosphere. A bond 20 is formed at the intersection of the wires 10. Experience shows that the yarn exerts an inward radial force on the mesh filament because each segment of the top set of wires which is suspended between the bottom set of wires is bent inward. Since there is no nickel plating on the wire the diffusion is an exchange of tungsten atoms from one wire with those in the adjacent wire. This action is known as self-diffusion.

The method can also be practiced with plated wires, such as nickel plated tungsten, in which case joints can be made at much lower temperatures still, such as 800°–900° C. This may be useful for other applications where it is not so imporant to eliminate the nickel alloys.

It has also been found that while the bonds are being made, the wire is being carburized. Since th e carburization is occurring while the mesh filament 14 is stretched on the mandrel and at such a low temperature, 1500° C. versus 2200° C. normally, the resulting filament is stronger and rounder than a spot welded filament which is later carburized. If the bonding is accomplished at lower temperatures, it may be necessary to carburize the mesh filament 14 during a second operation to obtain a desired carbide thickness.

Spot welding of the crossing wires is the most popular method of fabricating a mesh filament. This process introduces considerable strain into the mesh because the deformation from welding distorts the mesh. The mesh filament of the prior art is also distorted by carburizing because tungsten carbide occupies a volume 11% greater than the tungsten. These two causes of distortion are not present in the described method because bonding of all of the joints and carburizing of the wire are occurring simultaneously. The filament wire is stronger because its microstructure is fibrous, similar to that of cold drawn tungsten wire. The resulting mesh filament is round without any stored strain energies which will accelerate distorting it when the mesh filament is thermal cycled.

Many mesh filaments have been made in the temperature range of 1390° C. to 1525° C. One of these mesh filaments has been cycled on and off and has accumulated 3000 cycles. There is no noticeable distortion of this mesh filaments as would be obvious if the mesh filaments had been spot welded.

The carbon yarn used in reducing the invention to practice was "Braided Carbon Cordage" sold by Fiber Materials, Inc. of Biddleford, Maine. These cords are sold in yarns of 4K (4000), 12K, 18K and 24K individual filaments in a braided structure. The characteristics of interest in selecting the number of filaments is the uniformity desired in applying pressure to the assembly. The wraps of a 4K yarn are 3 times denser than the 24K yarn and should therefore apply a more uniform pressure to the assembly.

Preloading the yarn makes it possible to practice the method at lower temperatures. Mesh filaments of tungsten have been made at a temperature as low as 1390° C. using preloaded yarn. It is believed that pressure along does not accelerate the diffusion. Rather, the function of the pressure is to bring two surfaces into atomic contact with one another so that atoms can be exchanged across the interface. An additional benefit of a high pressure is that the wires are deformed in the region of tangential contact. This deformation increases the area of contact from a point to an area large enough that the mesh filament is rugged enough to be manually handled while assembling the mesh filament into a tube.

It is not clear at this time what the coefficient of expansion of the carbon yarn used in the invention is, but it is clear that the coefficient of expansion is either negative or, if positive, very small. From the functioning of the method of the invention it is clear that the coefficient of expansion of the carbon yarn is much less than that of the alumina mandrel. In an article published in Volume 1, Issue 2 of "Advances in Material and Processes", page 25, the coefficient of expansion of carbon fiber is given as $-0.55 \times 10^{-6}/°$ F.

A split mandrel design which can be disassembled from a filament subassembly having the filament joined to its supports by diffusion bonding is advantageous. The diffusion bonding would simultaneously join the crossing tungsten wires to each other and the filament wires to the molybdenum supports. Before the mandrel is removed from the subassembly, an external clamp would be placed around the supports to rigidly hold the filament. The clamp would prevent distortion and handling damage to the filament, and provide a reference plane to the grid supports so that the filament subassembly can be concentrically mounted in the stem. Most likely, the filament subassembly would be TIG welded to the stem. After welding both filament supports to the stem, the clamp would be removed from the filament subassembly. With this method of assembly, a more precise spacing can be maintained between the filament and the grids than is obtained by employing currently used manufacturing methods. This method of assembly which has just been described has not been tried, but is being considered in the long range plans for the diffusion bonded filament program.

Bonding could occur at temperatures less than 1000° C. if the materials being joined were more thermally active than tungsten. As a general rule, most diffusion bonds can be made near the recrystallization temperature of the material. The recrystallization temperature is dependent upon such factors as amount of cold work in the metal, impurities, time at temperature, and the starting grain size of the material. The recrystallization temperature is important because at this temperature, the first microstructural changes occur indicating that there is sufficient thermal energy available for the atoms to rearrange themselves. From the knowledge of recrystallization of other materials, it is possible to approximate the temperature at which they may be bonded. Since most materials recrystallize at temperature less than tungsten, most materials could be bonded at lower temperatures than mentioned in this disclosure. If the tungsten wire is coated with a material having a lower recrystallization temperature, it would be expected that the nature of the coating would dictate the joining temperature. If a coating is employed, consideration must then be given to the consequences of its behavior to the system when the system is subjected to temperatures higher than that during bonding.

Unlike materials can be bonded by the method of the invention. For example, the structure shown in FIG. 1 can be bonded with tungsten wires and molybdenum bands. The recrystallization temperature of molybdenum is lower than that of tungsten and these metals are soluble in each other. On the other hand, the tungsten wires do not stick to the alumina mandrel because the alumina and the metals are not soluble in one another. Also a pure grade 99.5% $Al_2O_3$ alumina is used so that there is hardly any glassy phase present in the alumina to adhere to the tungsten. In metallizing, it is the glassy phase either added to the metallizing paint or to the ceramic which promotes adherence.

The formation of filament structures according to the method of the invention has several additional advantages beyond the quality of the bonds formed. Rounder filaments can be formed in this way. The deviation from round is typically 0.001 inch which is nearly the same as that of the mandrel. The mandrel dimensions determine the inside diameter of the filament. Also, the method of the invention removes the residual stresses in the wires which were caused by drawing and wrapping the wire on the spool on which it was shipped.

The difference in thermal expansion of the alumina mandrel and the yarn causes an additional force to be exerted on the crossing wires when the assembly is heated. Since the yarn is flexible, similar to a piece of string, a uniform radial force is applied to the cylindrical surface of the mandrel. In this way, if end affects are ignored, it is similar to the HIP process, hot isostatic pressing. Hot isostatic pressing of parts is the current commercial process for densifying ceramic parts and castings which have voids in their microstructures. It is not difficult to envision using carbon yarn as a substitute for HIP furnaces. HIP is an expensive process and is only done to critical parts. Parts which have been subjected to HIP are stronger and tougher than before the treatment.

An electron gun having precise dimensions could be designed and fabricated using this bonding method. The ceramic insulators could be precisely grounded and the elements of the gun joined to them by diffusion bonding. Since accurately machined surfaces will be joined, variation in thicknesses or spacings due to metallizing and brazing will not be present in the completed gun structure.

As an example of the method of joining ceramics consider joining two pieces of alumina. It is important not to have a second material in the joint because it is desirable to retain all of the high temperature properties of the alumina in the joint. The joint might be expected to have a high operating temperature such as 1600° C. and any materials added to the joint, such as silica, will lower the softening temperature of the alumina.

The joint is made by polishing the facing ceramic surfaces in the same manner as metallographic samples are prepared for examination. The polishing entails the use of finer diamond laps until the 1 micron size lap is reached. Crystal damage from the preceding lap is always removed before proceeding to a finer lap. The polished surfaces are then cleaned to remove all residue from polishing. The bond between the two pieces of ceramic is made by wrapping them together with carbon yarn so that the joining surfaces are held in compression. When the assembly is heated the carbon yarn contracts and the parts expand, exerting a tremendous force on the joining surface. If the temperature is high enough for atomic diffusion, a bond will be made by exchanging atoms on each side of the interface. This phenomenom occurs rapidly in the temperature range of recrystallization or grain growth for the material.

This invention was demonstrated by joining two pieces of Coors AD94 and AD995 ceramics in the form of ASTM; CLM-15 tensile test pieces 30, shown in FIG. 3. The surfaces 32 to be joined were polished and then ultrasonically cleaned. To facilitate the wrapping of the carbon yarn 34 as shown in FIG. 4 around the abutting pieces, four notches 36 were cut into the flange ends of the parts at every 90°. The notches prevented the yarn from sliding off the edge of the pieces. Between 30 to 50 wraps of carbon yarn were wrapped around the abutting parts, alternating between two sets of notches 36. Additional yarn was wrapped around the mid-section of the assembly 90° to the first wraps, to pull the bonding yarn tighter and closer to the OD Of the assembly. This assembly was then fired in a wet 75/25 nitrogen hydrogen atmosphere at 1525° C. for ½ hour.

After firing the parts, the carbon yarn was cut loose from the assembly as shown in FIG. 5. The yarn was stretched and frail from reacting with the furnace atmosphere. The two pieces of ceramic were joined into a single piece 38 and were vacuum tight.

This invention is not limited to the preferred embodiments and alternatives heretofore described, to which variations and improvements may be made including mechanically and electrically equivalent modifications, changes and adaptations to component parts, without departing from the scope of production of the present patent and true spirit of the invention, the characteristics of which are summarized in the appended claims.

What is claimed is:

1. A diffusion bond mesh structure of substantially pure refractory metal wire formed by the method of:
   wrapping substantially pure refractory metal wires on a mandrel to form a loose mesh structure on a mandrel;
   wrapping said loose mesh structure on a mandrel in carbon yarn to form a wrapped structure;
   heating said wrapped structure to a temperature sufficient to cause diffusion bonding where said wires of said loose mesh structure on a mandrel cross;
   cooling said wrapped structure;
   unwrapping said carbon yarn from said composite structure; and
   removing said mandrel.

2. The diffusion bonded mesh structure of claim 1 wherein said temperature is at least the recrystallization temperature of said refractory metal wires.

3. The diffusion bonded mesh structure of claim 2 wherein said mandrel is made of material insoluble in the material of the wires.

* * * * *